United States Patent [19]

Hoffmann

[11] 4,129,143
[45] Dec. 12, 1978

[54] CHECK VALVE, ESPECIALLY FOR VACUUM-OPERATED INSTALLATIONS IN MOTOR VEHICLES

[75] Inventor: Rüdiger Hoffmann, Sindelfingen, Germany

[73] Assignee: Daimler-Benz Aktiengesellschaft, Germany

[21] Appl. No.: 808,953

[22] Filed: Jun. 22, 1977

[30] Foreign Application Priority Data

Jun. 24, 1976 [DE] Fed. Rep. of Germany ....... 2628314

[51] Int. Cl.² ............................................ F16K 15/14
[52] U.S. Cl. ..................................... 137/496; 137/859
[58] Field of Search ................................ 137/496, 859

[56] References Cited

U.S. PATENT DOCUMENTS 3,465,786  9/1969  Spisak ............................ 137/496 X
3,804,113  4/1974  Garcea ............................ 137/496

FOREIGN PATENT DOCUMENTS 2450301  4/1976  Fed. Rep. of Germany ........... 137/859
1123729  6/1956  France ........................... 137/859

Primary Examiner—Robert G. Nilson
Attorney, Agent, or Firm—Craig & Antonelli

[57] ABSTRACT

A check valve, especially for vacuum-operated installations in motor vehicles, which includes a two-partite housing and a roller diaphragm secured between the housing parts provided with inlet and outlet channels; the roller diaphragm which is pressed against its sealing seat by a prestressed spring, cooperates by means of its ring-shaped, curved diaphragm portion as movable sealing part with the bottom of one housing part constructed as sealing seat in such a manner that a central bore provided in the section of the roller diaphragm located on the side of the spring, connects the inlet channel terminating outside of the curved diaphragm portion with the outlet channel of the housing part, when the curved diaphragm portion lifts off from the sealing seat upon exceeding a predetermined differential pressure.

10 Claims, 1 Drawing Figure

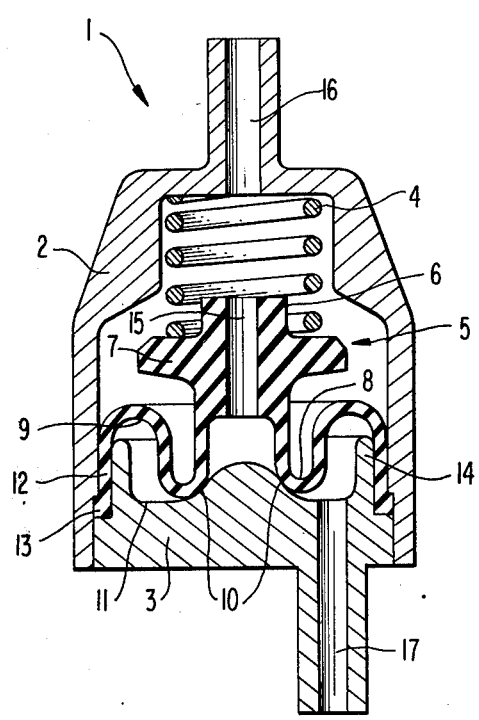

CHECK VALVE, ESPECIALLY FOR VACUUM-OPERATED INSTALLATIONS IN MOTOR VEHICLES

The present invention relates to a check valve, especially for vacuum-operated installations in motor vehicles, with a two-partite housing and with a roller diaphragm secured between the housing parts provided with inlet and outlet channels and forced on to a sealing seat by a prestressed spring.

The present invention is concerned with the task to so construct a check valve of this type that greater manufacturing tolerances can be permitted in series manufacture. Additionally, the valve should operate nearly noiselessly in contrast to the known series valves, which by reason of sharp edges or sealing lips as well as metallic inserts of the sealing bodies produce whistling noises.

The underlying problems are solved according to the present invention in that the roller diaphragm with a ring-shaped curved portion of the diaphragm as movable sealing part cooperates with the bottom of one housing part constructed as sealing seat in such a manner that a center bore provided in the section of the roller diaphragm located on the side of the spring connects the inlet channel terminating outside of the curved portion of the diaphragm, with the outlet channel provided in the other housing part, when upon exceeding a predetermined differential pressure, the curved portion of the diaphragm lifts off from the sealing seat.

According to the present invention, it is additionally proposed that the roller diaphragm includes two thin-walled curved or arcuate diaphragm portions consisting of soft elastic material, of which one curved diaphragm portion is connected with the considerably more thick-walled section constructed fixed-elastically.

By reason of the radial and axial movability of the roller diaphragm and the elasticity thereof, fewer requirements are made as regards the maintenance of tolerances with respect to sealing seat/sealing body.

Consequently, also temperature influences do not exert any negative influence on the functioning capability of the roller diaphragm. It operates considerably more trouble-free than prior art valves.

Furthermore, provision is made according to the present invention to construct the bottom of the housing part spherically shaped within the area of the curved or arcuate diaphragm portion.

The thin-walled roller diaphragm may thus center itself on the spherically shaped sealing seat and may adapt itself very well to the sealing surface.

In a preferred embodiment of the present invention, the section of the roller diaphragm may be constructed cylindrical and may be provided with a collar, on which the spring is supported.

As a further feature of the present invention, the roller diaphragm may be advantageously clamped-in axially parallelly between the housing parts in such a manner that during stroke movements, a part of the curved diaphragm portion rolls off at the housing-part inner-wall on the side of the spring. This arrangement enables an extraordinarily large stroke. The valve is thus insensitive against volume changes or the roller diaphragm in case of aggressive gases.

Accordingly, it is an object of the present invention to provide a check valve, especially for vacuum-operated installations in motor vehicles, which avoids by extremely simple means the aforementioned shortcomings and drawbacks encountered in the prior art.

Another object of the present invention resides in a check valve which permits greater manufacturing tolerances for mass production.

A further object of the present invention resides in a check valve, especially for vacuum-operated installations in motor vehicles, which operates nearly noiselessly.

Still a further object of the present invention resides in a check valve of the type described above which is less prone to troubles in operation and is not exposed to any negative temperature-influences.

A further object of the present invention resides in a check valve which is able to center itself on a spherically shaped sealing seat so that it not only can adapt itself well to the sealing seat surface but additionally also assures good sealing characteristics.

Another object of the present invention resides in a check valve which is insensitive against volume-changes of the roller diaphragm in case of aggressive gases.

These and other objects, features and advantages of the present invention will become more apparent from the following description when taken in connection with the accompanying drawing which shows, for purposes of illustration only, one embodiment in accordance with the present invention and wherein:

The single FIGURE is a cross-sectional view through a check valve in accordance with the present invention.

Referring now to the single FIGURE of the drawing, a check valve generally designated by reference numeral 1 for pneumatic or vacuum-operated installations in motor vehicles, for example, for central locking systems, for backrest locking systems, for air-conditioning installations, etc., includes two cylindrically shaped housing parts 2 and 3, of which the housing part 3 is securely screwed into the housing part 2 which is constructed bell-like.

A roller diaphragm generally designated by reference numeral 5 consisting of elastic material, for example, of rubber, which is movable against a prestressed spring 4, is disposed in the housing. The roller diaphragm 5 is composed of a stiff-elastic, cylindrically shaped section 6 with a collar 7 serving for the support of the spring 4 and of two thin-walled, soft-elastic curved diaphragm portions 8 and 9 which are inherently movable.

The curved diaphragm portion 8 cooperates as sealing part with the bottom 11 of the smaller housing part 3 constructed as sealing seat 10 whereby the sealing seat 10 has a spherical configuration.

The curved diaphragm portion 9 adjoining the curved diaphragm portion 8 radially outwardly thereof, is tightly and axially parallelly clamped-in with its cylindrically shaped part 12 and with its bead-like free end 13 between the housing parts 2 and 3 in an annular gap formed by the housing part 2 and by the annular portion 14 of housing part 3.

Possibly, the annular gap formed by the housing part 2 and by the annular portion 14 projecting from the bottom 11 of the housing part 3 may serve as loose seat for the cylindrically shaped part 12 of the roller diaphragm 5.

The stiff section 6 of the roller diaphragm 5 is provided with a center bore 15, which during the lifting-off of the roller diaphragm 5 from the sealing seat 10 as a result of a predetermined vacuum prevailing on the suction side, connects the outlet channel 16 arranged coaxially in the housing part 2 with the inlet channel 17 located eccentrically in the housing part 3 and terminating between the curved diaphragm portion 8 and the projecting annular portion 14.

As a result of the special configuration of the sealing seat 10 as well as the axially parallel seat between the housing parts 2 and 3, the roller diaphragm 5 assumes both sealing as also guide function. It serves therefore not only as sealing body but at the same time also as guide element for rectilinear stroke movements.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A check valve, comprising a two-partite housing means provided with inlet and outlet channel means and a roller diaphragm means pressed by a prestressed spring against its sealing seat means and secured between the housing parts of the two-partite housing means, characterized in that the roller diaphragm means includes an annularly shaped curved portion which as movable sealing part cooperates with the bottom of the one housing part constructed as sealing seat means in such a manner that a central bore provided in the section of the diaphragm means located on the side of the spring connects the inlet channel means terminating outside of the curved diaphragm portion, with the outlet channel means of the other housing part, when, upon exceeding a predetermined pressure difference, the curved diaphragm portion lifts off from the sealing seat means.

2. A check valve according to claim 1, characterized in that the check valve is for vacuum-operated installations in motor vehicles.

3. A check valve according to claim 1, characterized in that the diaphragm means includes two thin-walled curved diaphragm portions consisting of soft-elastic material, of which the curved diaphragm portion forming the sealing part is connected with the considerably more thick-walled, stiff-elastic section of the diaphragm means.

4. A check valve according to claim 3, characterized in that the bottom of the one housing part forming the sealing seat means has a spherically shaped configuration within the area of the curved diaphragm portion.

5. A check valve according to claim 4, characterized in that the more thick-walled section of the diaphragm means is cylindrically constructed and includes a collar, on which the spring is supported.

6. A check valve according to claim 5, characterized in that the diaphragm means is clamped-in axially parallelly between the housing parts in such a manner that during stroke movements, a part of the curved diaphragm portion rolls off at the housing-part inner-wall on the side of the spring.

7. A check valve according to claim 3, characterized in that the more thick-walled section of the diaphragm means is cylindrically constructed and includes a collar, on which the spring is supported.

8. A check valve according to claim 1, characterized in that the diaphragm means is clamped-in axially parallelly between the housing parts in such a manner that during stroke movements, a part of the curved diaphragm portion rolls off at the housing-part inner-wall on the side of the spring.

9. A check valve according to claim 1, characterized in that the bottom of the one housing part forming the sealing seat means has a spherically shaped configuration within the area of the curved diaphragm portion.

10. A check valve according to claim 9, characterized in that the diaphragm means is clamped-in axially parallelly between the housing parts in such a manner that during stroke movements, a part of the curved diaphragm portion rolls off at the housing-part inner-wall on the side of the spring.

* * * * *